US012192392B2

(12) United States Patent
Lee et al.

(10) Patent No.: US 12,192,392 B2
(45) Date of Patent: Jan. 7, 2025

(54) ELECTRONIC DEVICE INCLUDING SLIDE BODY HAVING ROTARY CAMERA MODULE

(71) Applicant: Samsung Electronics Co., Ltd., Gyeonggi-do (KR)

(72) Inventors: Youngsun Lee, Gyeonggi-do (KR); Eunseok Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 17/671,899

(22) Filed: Feb. 15, 2022

(65) Prior Publication Data

US 2022/0174138 A1     Jun. 2, 2022

Related U.S. Application Data

(63) Continuation of application No. PCT/KR2020/007810, filed on Jun. 17, 2020.

(30) Foreign Application Priority Data

Aug. 16, 2019   (KR) .................. 10-2019-0100155

(51) Int. Cl.
*H04M 1/02*       (2006.01)
*H01F 7/02*       (2006.01)

(52) U.S. Cl.
CPC ........ *H04M 1/0264* (2013.01); *H01F 7/0231* (2013.01); *H04M 1/0237* (2013.01)

(58) Field of Classification Search
CPC ........... H04M 1/0264; H04M 2250/20; H04M 1/0237; H04M 1/0235; H01F 7/0231; H01F 7/0242
See application file for complete search history.

(56) References Cited

U.S. PATENT DOCUMENTS

2005/0014538 A1   1/2005   Hyun et al.
2016/0128217 A1   5/2016   Yoo et al.
(Continued)

FOREIGN PATENT DOCUMENTS

CN       103475782 B       9/2015
CN       103293828 B       1/2016
(Continued)

OTHER PUBLICATIONS

Ye et al., communication device, Aug. 2019, pp. 1-12 (Year: 2019).*

(Continued)

*Primary Examiner* — Keith Ferguson
(74) *Attorney, Agent, or Firm* — Cha & Reiter, LLC

(57) ABSTRACT

According to certain embodiments, an electronic device comprises: a housing having an innerspace; a slide body slidably connected to the housing, the slide-body including an opening and at least one magnetic force generating member disposed in the opening; and a camera module assembly connected rotatably to the opening in the slide body, the camera module assembly including a module housing and at least one camera module disposed in the module housing, wherein the camera module assembly includes at least one magnetic force reactive member disposed to react to a magnetic force of the at least one magnetic force generating member, and wherein the at least one magnetic force reactive member is disposed at a position affected by the magnetic force of the at least one magnetic force generating member when the slide body slides out from the housing or slides in into the housing.

18 Claims, 14 Drawing Sheets

(56) References Cited

U.S. PATENT DOCUMENTS

| | | | |
|---|---|---|---|
| 2019/0320253 A1* | 10/2019 | Park | H04R 1/345 |
| 2020/0020470 A1* | 1/2020 | Wang | G01D 5/145 |
| 2020/0213491 A1 | 7/2020 | Huang et al. | |

FOREIGN PATENT DOCUMENTS

| | | |
|---|---|---|
| CN | 110166657 B | 7/2020 |
| KR | 10-2005-0009412 A | 1/2005 |
| KR | 10-2006-0089816 A | 8/2006 |
| KR | 10-0686112 B1 | 2/2007 |
| KR | 10-2014-0022610 A | 2/2014 |
| KR | 10-1727512 B1 | 4/2017 |
| KR | 10-1835036 B1 | 3/2018 |
| WO | 2019/015651 A1 | 1/2019 |

OTHER PUBLICATIONS

Zhong, Peng, Camera module controlling method and device, Mar. 2019, pp. 1-10 (Year: 2019).*
KR 20060012369 A, Kwon Hyug Mann, Feb. 2006, A slide type of mobile communication terminal with rolling camera, pp. 1-6 (Year: 2006).*
Korean Office Action dated Sep. 19, 2023.

* cited by examiner

ELECTRONIC DEVICE INCLUDING SLIDE BODY HAVING ROTARY CAMERA MODULE

CROSS-REFERENCE TO RELATED APPLICATION(S)

This application is a continuation of International Application No. PCT/KR2020/007810, filed on Jun. 17, 2020, which claims priority to Korean Patent Application No. 10-2019-0100155, filed on Aug. 16, 2019 in the Korean Intellectual Property Office, the disclosures of which are herein incorporated by reference.

TECHNICAL FIELD

Certain embodiments of the disclosure relate to an electronic device including a slide body having a rotary camera module.

BACKGROUND

Electronic devices are gradually becoming slimmer while maintaining the rigidity. Electronic devices may include a slide body that slides from a housing. The slide body may include at least one electronic component and perform a corresponding function in a state of slide-out from the housing. The electronic device including such a slide body may require a reliable structure to avoid malfunctioning.

The above information is presented as background information only to assist with an understanding of the disclosure. No determination has been made, and not assertion is made, as to whether any of the above might be applicable as prior art with regard to the disclosure.

An electronic device according to certain embodiments of the disclosure may utilize one camera module as a front camera and a rear camera. A slide type electronic device may include a slide body installed to be slidable by a certain reciprocating distance from a housing. The slide body may accommodate at least one electronic component and perform a corresponding function using the at least one electronic component even when the slide body slides out from the housing or slides in into the housing. Such electronic components may include at least one camera module (e.g., a camera module assembly) or at least one sensor module. For example, the camera module may be configured to rotate to the rear of the electronic device when the slide body slides in into the housing, and rotate to the front when the slide body slides out from the housing. This makes it possible to photograph subjects in directions opposite to each other based on the slide-in/slide-out operations of the slide body.

However, frequent slide-in/slide-out operations of the slide body may cause the deformation of an elastic support structure using springs, wear and tear to the gear assembly structure (e.g., an assembly structure of rack gear and pinion gear), and/or the interference of surrounding structures (e.g., a repelling structure of a surrounding FPCB). Additionally, tilting may occurs (e.g., mismatch) causing the surface of the camera to not match the outer surface of the slide body and partially protrusion may occur. This may cause a malfunction of the slide body and inconvenience in the photographing operation of the camera module.

SUMMARY

Certain embodiments of the disclosure may provide an electronic device including a camera module.

Certain embodiments of the disclosure may provide an electronic device including a camera module in which operation reliability is guaranteed even after a long operation.

According to certain embodiments, an electronic device comprises: a housing having an inner space; a slide body slidably connected to the housing, the slide-body including an opening and at least one magnetic force generating member disposed in the opening; and a camera module assembly connected rotatably to the opening in the slide body, the camera module assembly including a module housing and at least one camera module disposed in the module housing, wherein the camera module assembly includes at least one magnetic force reactive member disposed to react to a magnetic force of the at least one magnetic force generating member, and wherein the at least one magnetic force reactive member is disposed at a position affected by the magnetic force of the at least one magnetic force generating member when the slide body slides out from the housing or slides in into the housing.

According to certain embodiments, an electronic device may include a housing having an inner space, a slide body disposed slidably from the housing and including an opening and at least one magnetic force generating member disposed in the opening, and a camera module assembly including a module housing disposed rotatably through the opening in the slide body and at least one magnetic force reactive member disposed to react to a magnetic force of the at least one magnetic force generating member in the module housing. The at least one magnetic force reactive member may be disposed at a position affected by the magnetic force of the at least one magnetic force generating member in a state that the slide body slides out from the housing or slides in into the housing.

According to certain embodiments, an electronic device (e.g., the electronic device 200 in FIG. 2A) may include a housing having an inner space, a slide body disposed slidably from the housing and including an opening and at least one magnetic force generating member disposed in the opening, and a rotating structure including a module housing disposed rotatably through the opening in the slide body, and at least one magnetic force reactive member disposed to react to a magnetic force of the at least one magnetic force generating member in the module housing. The at least one magnetic force reactive member may be disposed at a position affected by the magnetic force of the at least one magnetic force generating member in a state that the slide body slides out from the housing or slides in into the housing.

According to certain embodiments of the disclosure, a rotation support structure of a camera module is provided which prevents a tilting phenomenon (mismatch phenomenon) caused by a slide operation of a slide body even when used for a long time and enables rotation to a constant position at all times. Therefore, it can help to improve the operational reliability of the electronic device.

BRIEF DESCRIPTION OF DRAWINGS

In connection with the description of the drawings, the same or similar reference numerals may be used for the same or similar components.

DETAILED DESCRIPTION

Figure 1:
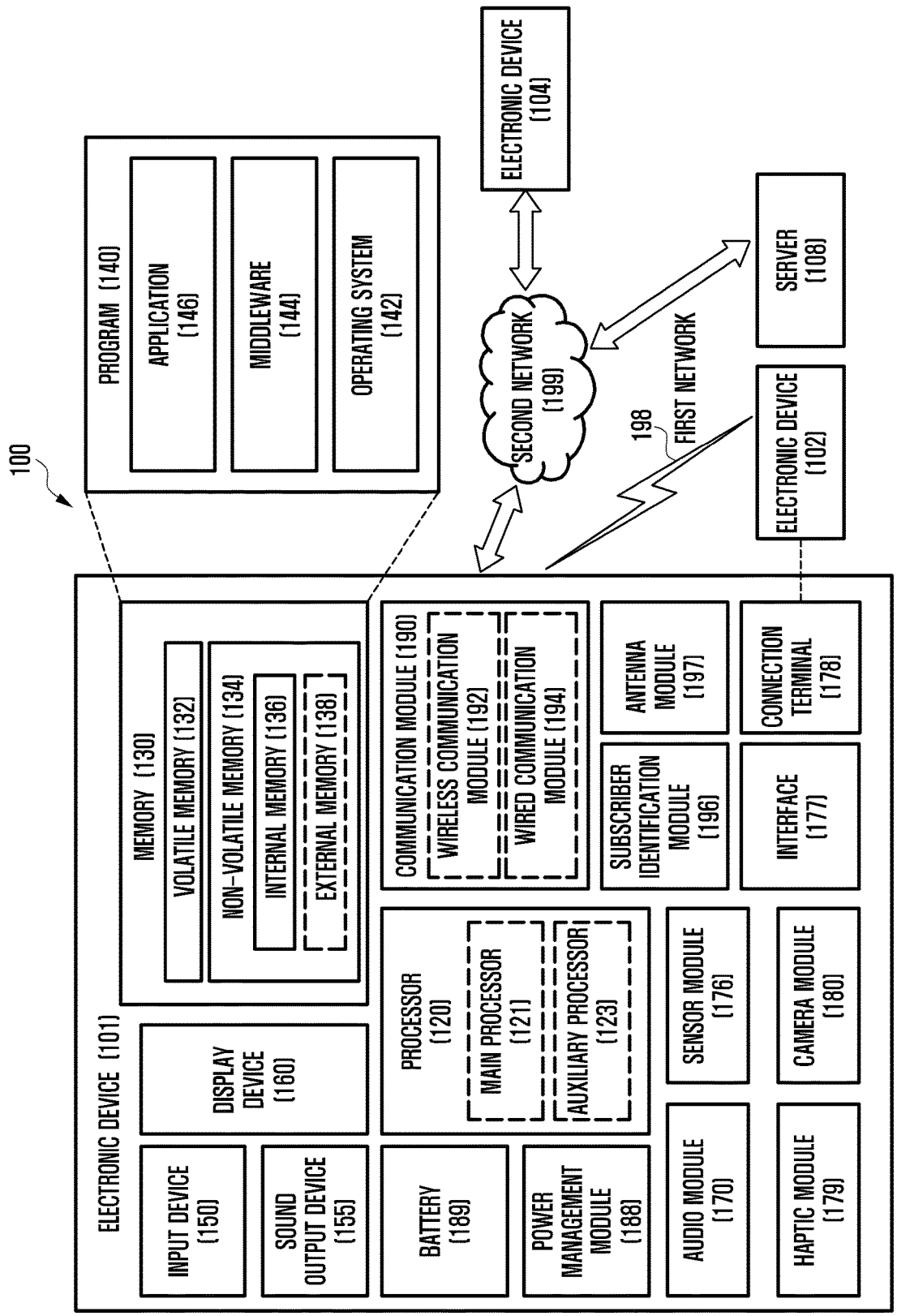
FIG. 1 is a block diagram of an electronic device in a network environment according to certain embodiments of the disclosure.
Figure 3A:
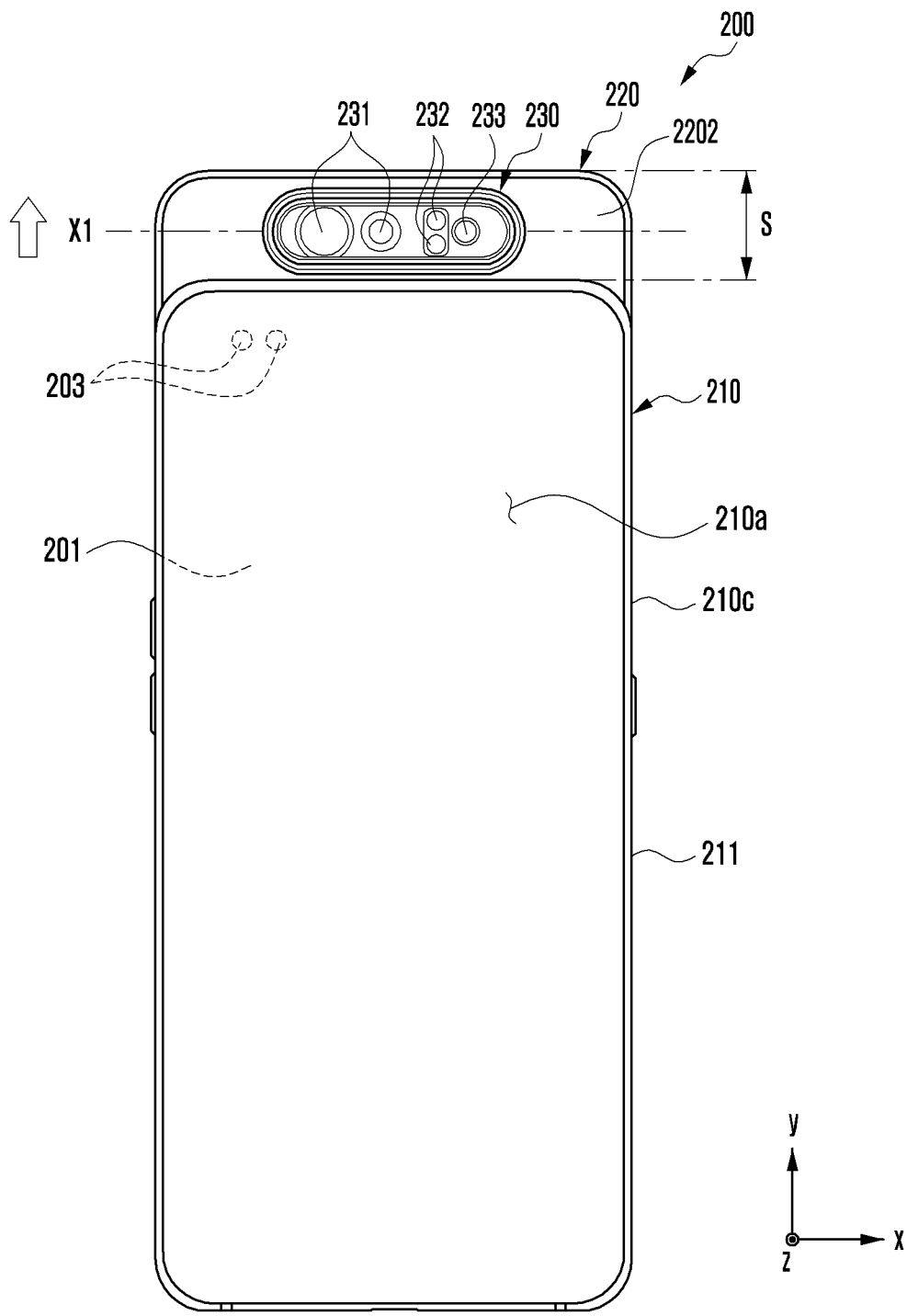
FIGS. 3A and 3B are front and rear views illustrating an electronic device with a slide body in a slide-out state according to certain embodiments of the disclosure.
Figure 3B:
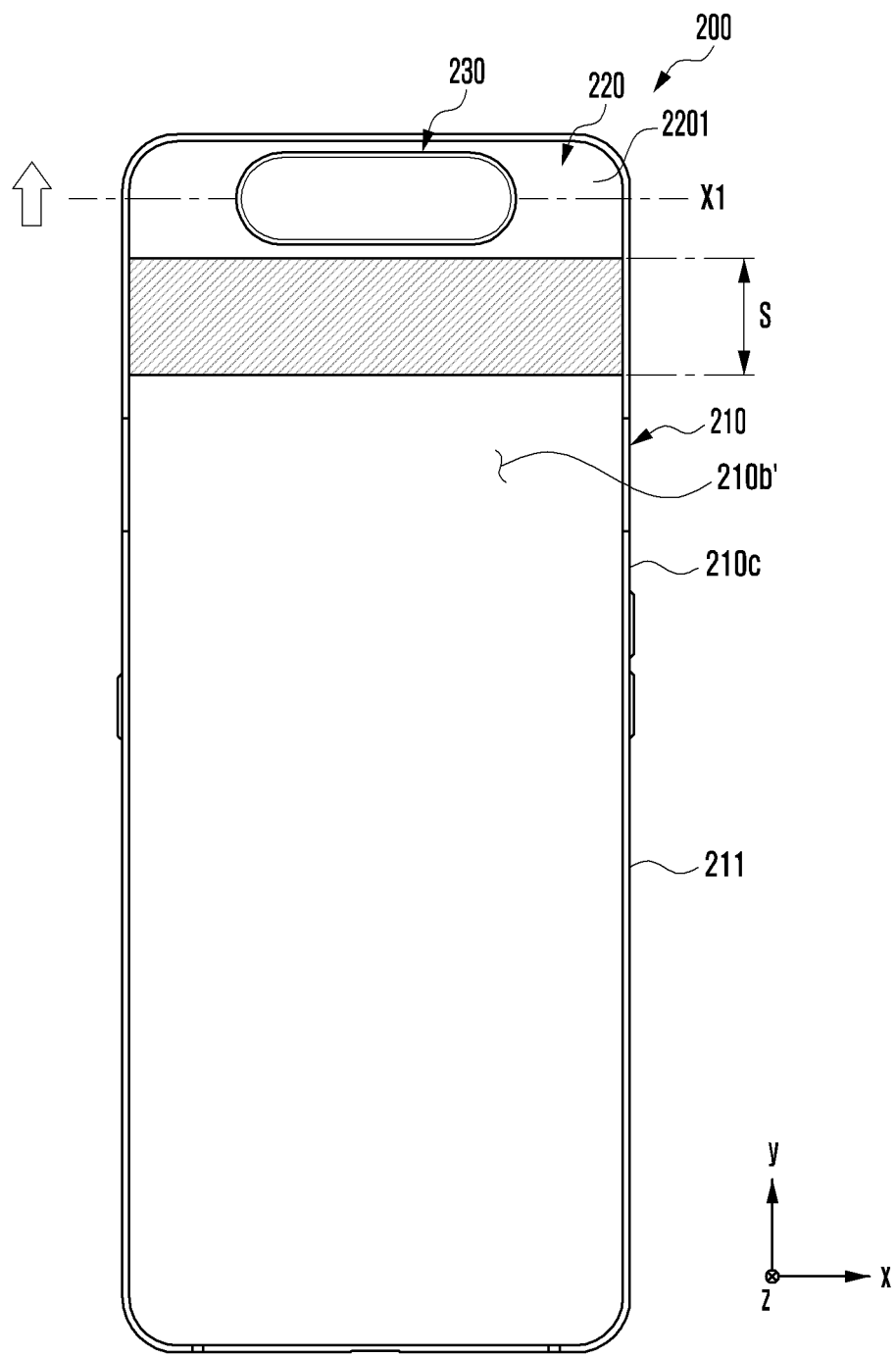
Figure 4:
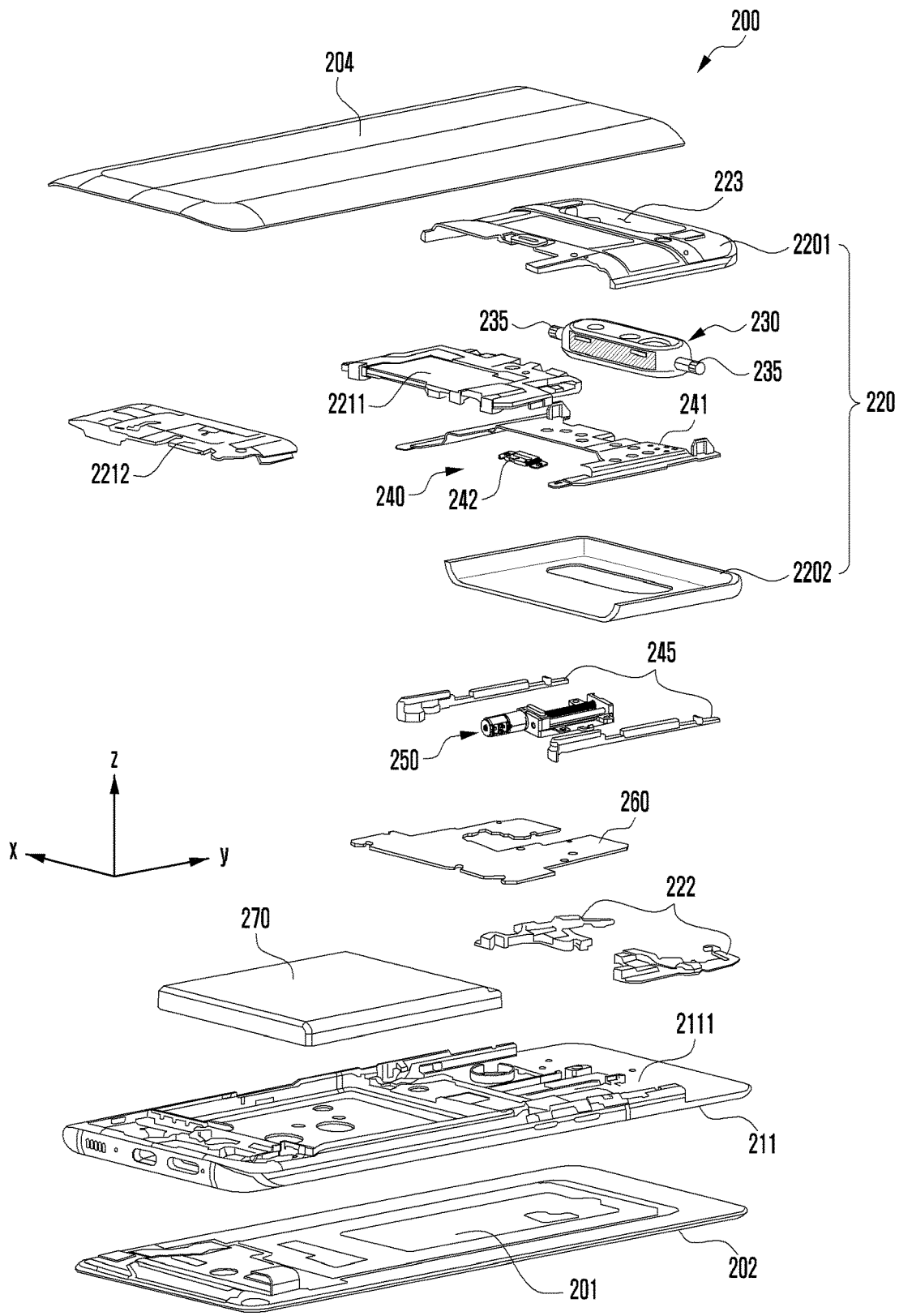
FIG. 4 is an exploded perspective view illustrating an electronic device according to certain embodiments of the disclosure.

FIG. 1 is block diagram of an electronic device 101. The electronic device 101 can provide many functions like operate as a telephone, internet access, and may include a camera. The electronic device 101 can be disposed in a housing, which is shown from the outside in FIGS. 2A, 2B, 3A, and 3B. FIG. 4 shows the interior of the housing.

Electronic devices may include a slide body that slides from a housing as shown in FIG. 5. The slide body may include at least one electronic component and perform a corresponding function in a state of slide-out from the housing.

Electronic Device

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector.

The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, The module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

The electronic device 101 includes a camera module 180. The camera module 180 can be mounted on the electronic device 101 to take pictures or video of the outside of the electronic device 101.

The camera module 180 can be disposed to be exposed to the outside through the housing, either through transparent material, or an opening.

Housing

The electronic device 101 can be disposed in a slidable housing. The slidable housing can include a housing structure 210 and a slide body 220. The slidable housing can either be in a slide-in state as shown in FIGS. 2A and 2B, or a slide-out states as shown in FIGS. 3A and 3B.

Figure 2A:
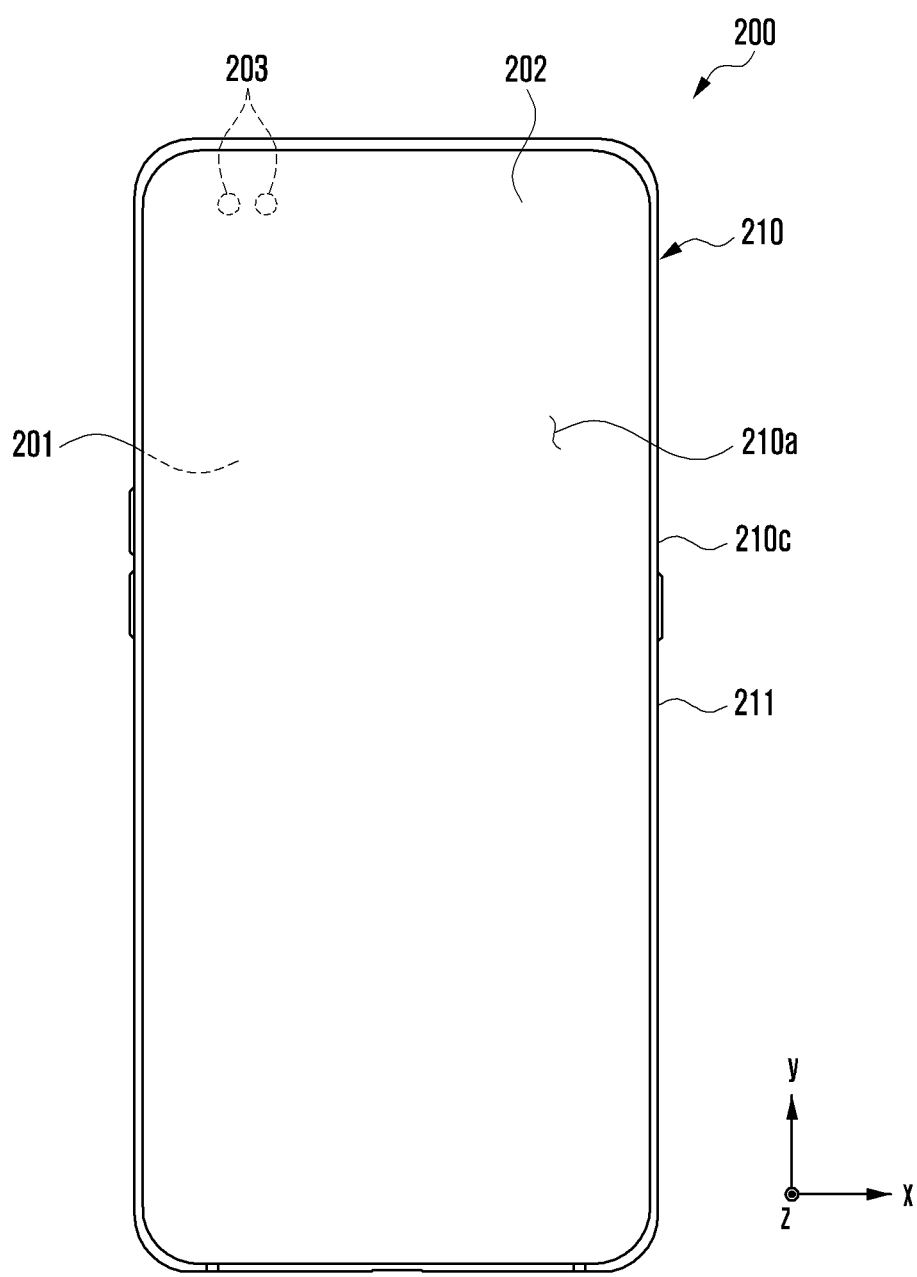
FIGS. 2A and 2B are front and rear views illustrating an electronic device with a slide body in a slide-in state according to certain embodiments of the disclosure.
Figure 2B:
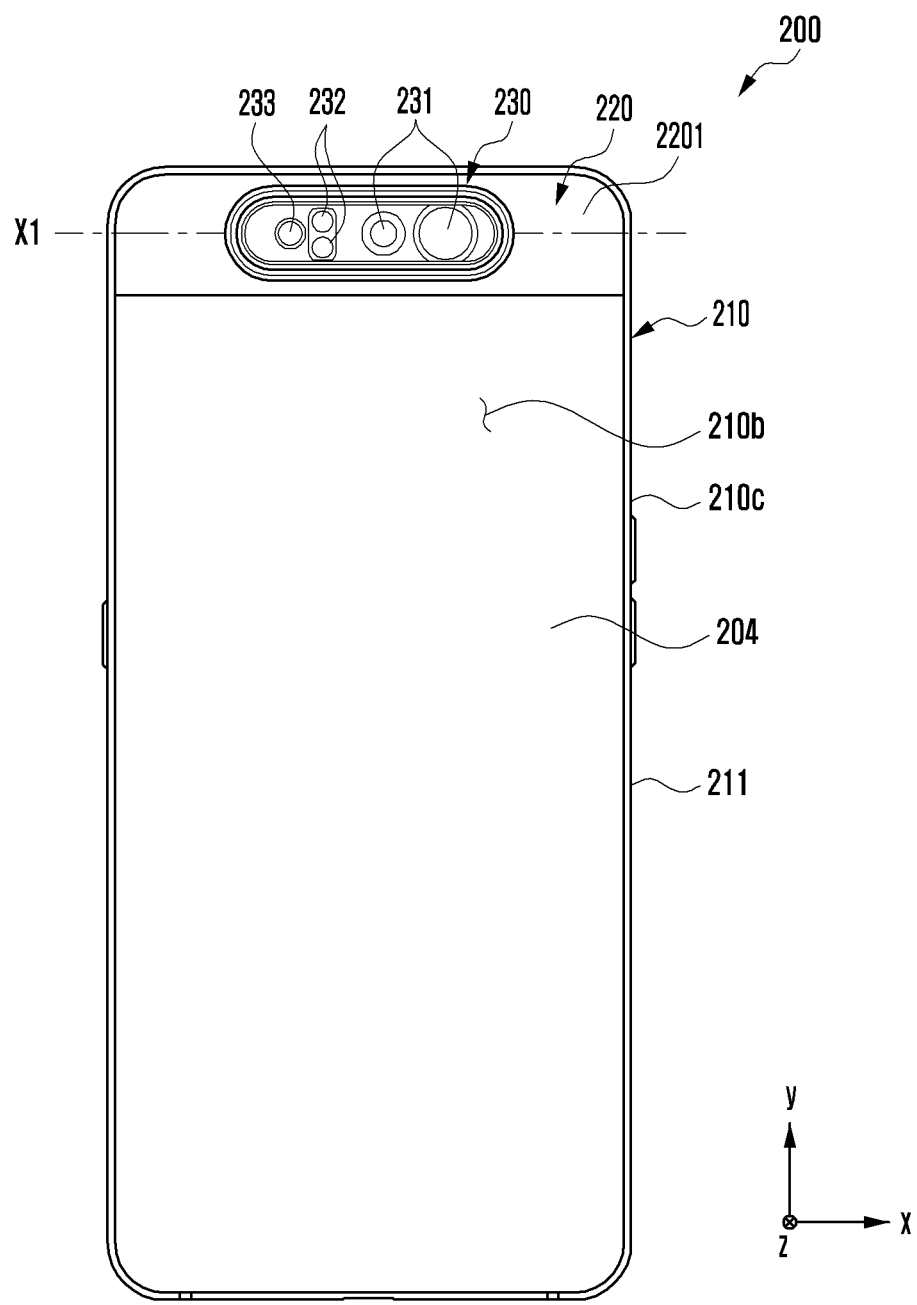

FIGS. 2A and 2B are front and rear views illustrating an electronic device 200 with a slide body 220 in a slide-in state according to certain embodiments of the disclosure. FIGS. 3A and 3B are front and rear views illustrating an electronic device 200 with a slide body 220 in a slide-out state according to certain embodiments of the disclosure.

The electronic device 200 of FIGS. 2A to 3B may be similar at least in part to the electronic device 101 of FIG. 1 or may further include other embodiments of the electronic device.

With reference to FIGS. 2A to 3B, the electronic device 200 may include a housing structure 210. The housing structure 210 has a front surface 210*a* (e.g., a first surface), a rear surface 210*b* or 210*b*'(e.g., a second surface), and a side surface 210*c*. The rear surface 210*b*, 210*b*' faces the opposite direction to the front surface 210*a*. The side surface 210*c* surrounding at least in part of a space between the front surface 210*a* and the rear surface 210*b* or 210*b*'. The front surface 210*a* of the electronic device 200 may at least partially extend to form at least a portion of the side surface 210*c* or at least a portion of the rear surface 210*b* or 210*b*'. In another embodiment, the front surface 210*a*, the rear surface 210*b* or 210*b*', or the side surface 210*c* of the electronic device 200 may be integrally formed.

The front surface 210a may be formed through a front cover 202 (e.g., a front plate or a display window) (e.g., a glass plate having various coating layers, or a polymer plate) that is at least in part substantially transparent. The front cover 202 may be disposed to form substantially the entire area of the front surface 210a. At least a portion of the rear surface 210b or 210b' may be formed through a substantially opaque rear cover 204 (e.g., a rear plate).

The rear cover 204 may be formed of, for example, coated or colored glass, ceramic, polymer, metal (e.g., aluminum, stainless steel (STS), or magnesium), or a combination of at least two of the above materials. The side surface 210c may be formed of a side member 211 (e.g., a side bezel structure) that is combined with at least a portion of the front and rear covers 202 and 204 and includes a metal and/or a polymer. In another embodiment, at least portions of the rear cover 204 and the side member 211 may be integrally formed and include the same material (e.g., a metal material such as aluminum).

The front cover 202 may be formed of a flat portion that is substantially flat in its entire area. In another embodiment, the front cover 202 may also include a curved portion that is formed on one or both long edges of the front cover 202 and extends from the central flat portion. The rear cover 204 may be formed of a flat portion that is substantially flat in its entire area. In another embodiment, the rear cover 204 may also include a curved portion that is formed on one or both long edges of the rear cover 204 and extends from the central flat portion.

The electronic device 200 may include a slide body (the slide body 220 in FIG. 2B) that is installed to be slidable in or out at a predetermined distance into or from the housing structure 210. The electronic device 200 may be configured to change the area of the rear surface 210b or 210b' of the housing structure 210 through a slide-out operation of the slide body 220. The slide body 220 may include a first slide cover 2201 facing in substantially the same direction as the rear cover 204, and a second slide cover 2202 facing in the opposite direction to the first slide cover 2201 and facing in substantially the same direction as the front cover 202.

The electronic device 200 may be configured such that when the slide body 220 slides in into the housing structure 210, the outer surface of the first slide cover 2201 and the outer surface of the rear cover 204 meet to coincide with each other. That is, the outer surface of the first slide cover 2201 and the outer surface of the rear cover 204 may have the look and/or feel of a single continuous surface. Accordingly, a first rear surface 210b is formed to have substantially the same area as the front cover 202.

In another embodiment, the slide body 220 may be disposed outside the housing structure 210 to be slidable with respect to the housing structure 210. In this case, the second slide cover 2202 may be disposed so as not to be seen from the outside when it slides in into the housing structure 210. When the slide body 220 slides out from the housing structure 210, the first slide cover 2201 is spaced upward (e.g., the y-axis direction in FIG. 3A) from the rear cover 204 by a predetermined movable distance S, and thereby a modified second rear surface 210b' having a larger area than that of the front cover 202 may be formed. In this case, when the front cover 202 is viewed from above, the second slide cover 2202 may be moved to a position where at least a portion thereof can be seen from the outside.

The slide body 220 may include a camera module assembly 230. The camera assembly 230 may be rotatably connected to the interior and configured to rotate on a rotation axis (e.g., the X1 axis in FIG. 2B, 3A, or 3B) in response to a sliding operation. The camera module assembly 230 may be installed to be at least partially rotatable in an interior space of the slide body 220.

The camera module assembly 230 may include at least one camera module 231 disposed to be exposed to the outside in the inner space of a module housing (e.g., a camera housing). In a state that the slide body 220 slides in into the housing structure 210, the camera module assembly 230 may be disposed at a position where the camera module 231 can photograph a subject in a direction faced by the rear cover 204. In a state that the slide body 220 slides out from the housing structure 210, the camera module assembly 230 may be rotated about the X1 axis as a rotation axis and then disposed such that the camera module 231 can photograph a subject in a direction faced by the front cover 202. That is, in the slide-in state, the camera assembly 230 faces the rear. In the slide-out state, the camera assembly 230 faces the front.

The camera module assembly 230 may include a flash 233 or at least one sensor module 232 in addition to the camera module 231. The at least one sensor module 232 may generate an electrical signal or data value corresponding to an internal operating state and/or an external environmental state of the electronic device 200. The at least one sensor module 232 may include at least one of a proximity sensor, an illuminance sensor, an ultrasonic sensor, a distance detection sensor (e.g., a time of flight (TOF) sensor), or a heart rate monitoring (HRM) sensor.

The slide-in and slide-out state can be controlled by a processor, in response to a user command, or event. The processor (e.g., the processor 120 in FIG. 1) of the electronic device 200 may enable a driving unit (e.g., the driving unit 250 in FIG. 4) to automatically slide out the slide body 220 from the housing structure 210 when detecting an event (e.g., a front camera shooting mode or a self-camera shooting mode). In this case, interlocking with the slide-out operation of the slide body 220, the camera module assembly 230 may be automatically rotated based on the rotation axis X1 such that the at least one camera module 231 is oriented in a direction faced by the front cover 202.

When the event (e.g., the front camera shooting mode or the self-camera shooting mode) is terminated or a state is changed, the processor (e.g., the processor 120 in FIG. 1) of the electronic device 200 may enable the driving unit to automatically slide in the slide body 220 into the housing structure 210. In this case, interlocking with the slide-in operation of the slide body 220, the camera module assembly 230 may be automatically rotated to face the rear.

The electronic device 200 may include a display 201 (e.g., a flexible display). The display is visible from the outside through at least a portion (substantially, most of the front surface 210a) of the front cover 202 in the inner space. The electronic device 200 may include at least one sensor module 203 disposed in the inner space. The at least one sensor 203 may be capable of detecting an external environment through the front cover 202 and/or the display 201. The at least one sensor module 203 may include an optical sensor (e.g., an illuminance sensor, a biometric sensor, an ultrasonic sensor, or a distance detection sensor). Although not shown, the electronic device 200 may also include a gesture sensor, a gyro sensor, a barometric pressure sensor, a magnetic sensor, an acceleration sensor, a grip sensor, a color sensor, an infrared (IR) sensor, a temperature sensor, or a humidity sensor, which is disposed in the inner space for detecting an internal operating state and/or an external environmental state of the electronic device 200.

Although not shown, the electronic device 200 may include at least one of an input device (e.g., at least one key button or a microphone module), a sound output device (e.g., a receiver, an ear jack assembly, or at least one external speaker module), or a connector (e.g., an interface connector port), which is disposed in the inner space and exposed at least in part to the outside.

The electronic device 200 may include a coupling structure that connects the slide body 220 and the driving unit (e.g., the driving unit 250 in FIG. 4) disposed in the inner space. The coupling structure may include a nut frame (e.g., the nut frame 254 in FIG. 5B) including a locking protrusion (e.g., the locking protrusion 2541 in FIG. 5B), and a locker (e.g., the locker 242 in FIG. 5B) including a locking groove (e.g., the locking groove 2421 in FIG. 5B) which the locking protrusion 2541 is inserted into and engaged with.

The electronic device 200 may include a structure that preventing tilting. The structure assists the rotation of the camera module assembly 230 after the slide body 220 slides in or slides out from the housing structure 210. The structure may include a magnetic force generating member and magnetic force reactive member that is attracted to the magnetic force generating member. The structure induces the outer surface of the camera module assembly 230 to coincide with the outer surface of the slide body 220 without protrusion, when the camera module assembly 230 faces the front in the slide-out state. Through the magnetic force reactive member responding to the magnet, the camera module assembly 230 may also be induced to rotate.

The camera module assembly 230 is faces the rear when the electronic device 200 is in the slide-in state and faces the front when the electronic device 200 is in the slide-out state. When the slide body is slid out from the housing 210, the camera module assembly 230 rotates about an axis.

Figure 5A:
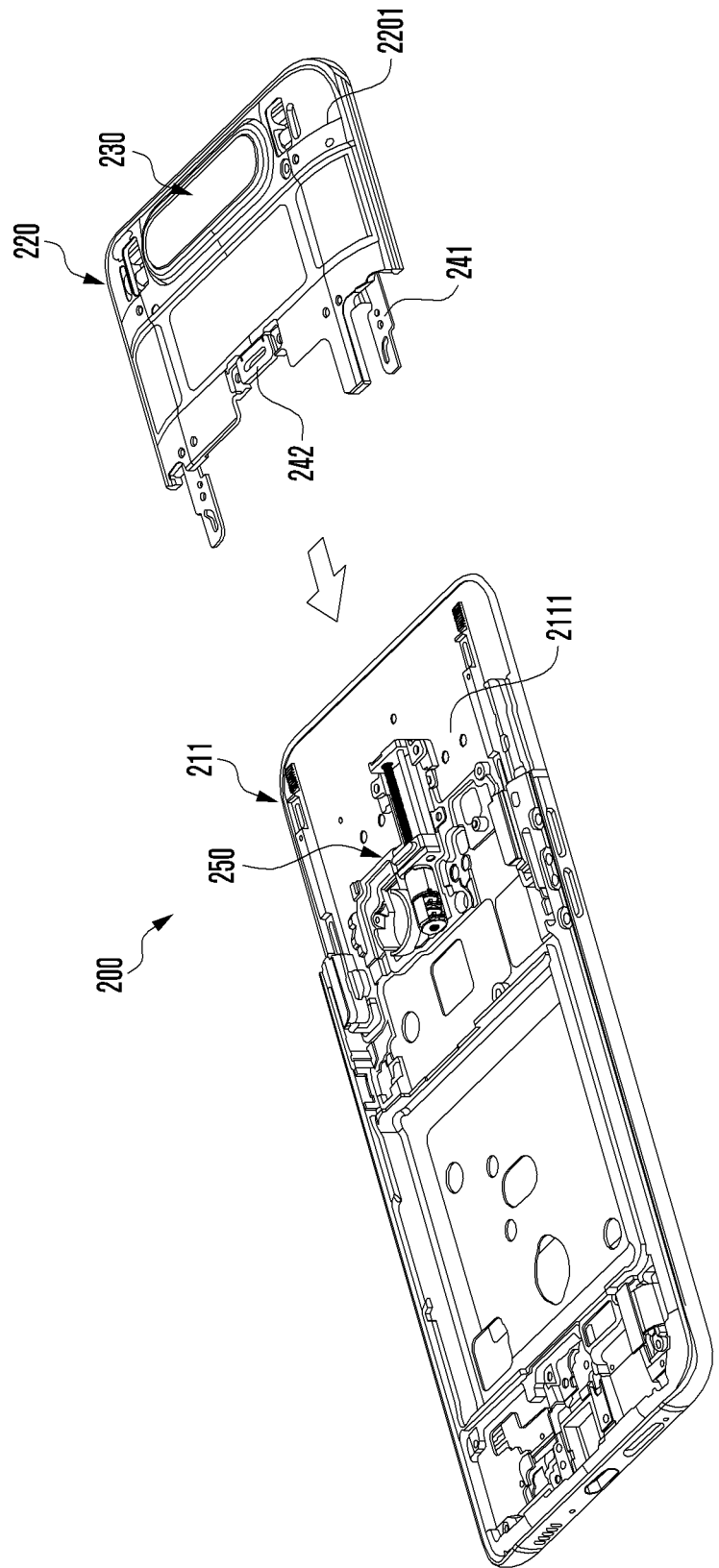
FIG. 5A is an exploded perspective view illustrating a side member and a slide body according to certain embodiments of the disclosure.
Figure 5B:
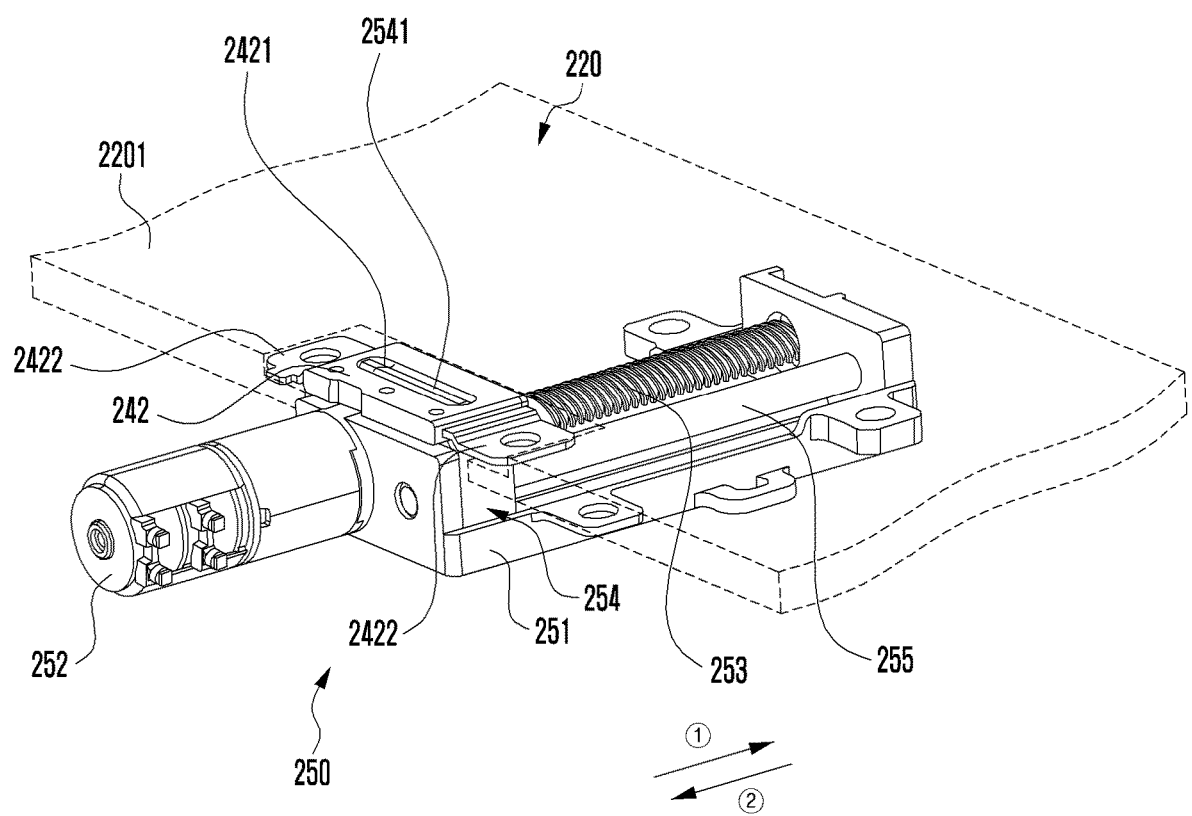
FIG. 5B is a perspective view illustrating the configuration of a driving unit according to certain embodiments of the disclosure.

FIG. 4 is an exploded perspective view illustrating an electronic device according to certain embodiments of the disclosure. FIG. 5A is an exploded perspective view illustrating a side member and a slide body according to certain embodiments of the disclosure. FIG. 5B is a perspective view illustrating the configuration of a driving unit according to certain embodiments of the disclosure.

With reference to FIGS. 4 to 5B, the electronic device 200 may include the front cover 202, rear cover 204, and the side member 211. The rear cover 204 faces the opposite direction to the front cover 202. The side member 211 surrounds a space between the front cover 202 and the rear cover 204. The side member 211 may include a side surface (e.g., the side surface 210c in FIG. 2A) that forms at least part of the exterior of the electronic device 200, and a support member 2111 (e.g., a support structure). The support member 2111 extends at least partially from the side surface to the inner space and supports at least one electronic component disposed inside the electronic device 200.

The electronic device 200 may include the display 201 that is disposed in the inner space and is visible from the outside through at least a portion of the front cover 202. The electronic device 200 may include, as at least one electronic component supported by the support member 2111 in the inner space, a battery 270 and at least one printed circuit board (PCB) 260 disposed side-by-side or at least partially overlapping with the battery 270. The electronic device 200 may include one or more rear brackets 2211 and 2212 combined with at least a portion of the support member 2111 to reinforce the rigidity of the electronic device 200 and protect internal electronic components.

The electronic device 200 may include the slide body 220 that is disposed to slide out from the side member 211 and protrude to the outside of the electronic device 200. The slide body 220 may include the first slide cover 2201 disposed to face in the same direction as the rear cover 204, and the second slide cover 2202 disposed to face in the opposite direction to the first slide cover 2201. The slide body 220 may include the camera module assembly 230. The camera module assembly 230 can be disposed in an internal space formed through the first and second slide covers 2201 and 2202. The camera module assembly 230 can be rotatable and exposed through an opening 223 formed by at least a portion of the first and second slide covers 2201 and 2202. The camera module assembly 230 may include at least one camera module (e.g., the camera module 231 in FIG. 2B) at least partially exposed to the outside.

The electronic device 200 may include a slide hinge unit 240 disposed between the slide body 220 and the side member 211 and guiding the slide body 220 to reciprocate in the y-axis direction from the side member 211, and a driving unit 250 disposed in the inner space of the electronic device 200 and connected to at least a part of the slide hinge unit 240 to provide a driving force to the slide body 220. The slide hinge unit 240 may include a slide plate 241 disposed in the slide body 220 and slidably connected to at least one slide bracket 222 fixed to the side member 211, and a locker 242 disposed in the slide body 220. The locker 242 may be connected to a nut frame (e.g., the nut frame 254 in FIG. 5B) to be described later of the driving unit 250 and transfer a driving force provided by the driving unit 250 to the slide body 220.

The electronic device 200 may include a rack gear module 245 disposed on the slide plate 241 and having at least one rack gear engaged with a pinion gear of at least one pinion gear 235 of the camera module assembly 230. The at least one rack gear module 245 may be disposed to move together with the slide plate 241 up to a certain moving distance in the slide-out of the slide body and thereafter allow only the slide plate 241 to move, thereby inducing the rotation of the camera module assembly 230 itself.

With reference to FIG. 5B, in an embodiment, the driving unit 250 may include a motor housing 251 disposed in the inner space of the electronic device 200, a driving motor 252 disposed on at least one side of the motor housing 251, a driving shaft 253 rotatably disposed in the motor housing 251 to receive a rotational force of the driving motor 252, and a nut frame 254 disposed to be movable in a slide-out direction (the direction (D in FIG. 5B) or a slide-in direction (the direction 2 in FIG. 5B) of the slide body 220 in response to the rotation of the driving shaft 253. The motor housing 251 may be fixed to the support member (e.g., the support member 2111 in FIG. 4) through a screw. The driving shaft 253 may have screw threads formed on its outer circumferential surface, and the nut frame 254 through which the driving shaft 253 passes may also have screw threads formed on the inner circumferential surface of its through hole. Therefore, by the screw coupling between the screw threads of the driving shaft 253 and the screw threads of the nut frame 254, the nut frame 254 may be guided to move linearly in a direction (e.g., the direction CD or the direction θ in FIG. 5B) perpendicular to the rotation direction in response to the rotation of the driving shaft 253. The driving unit 250 may further include a guide shaft 255 that is disposed to pass through the nut frame 254 near the driving shaft 253, does not rotate in synchronization with the rotation of the driving shaft 253, and guides the nut frame 254 to make a linear motion only in a longitudinal direction of the driving shaft 253. The nut frame 254 may include a locking protrusion 2541 protruding in the direction of the rear cover (e.g., the rear cover 204 in FIG. 4).

The slide body 220 may include a locker 242 having a locking groove 2421 formed therein. Through a coupling structure in which the slide body 220 is slidably assembled to the side member (e.g., the side member 211 in FIG. 4) and the locking protrusion 2541 of the nut frame 254 is inserted in the locking groove 2421 of the locker 242, the driving force of the driving motor 252 may be transferred to the slide body 220. The locker 242 may include at least one flange 2422 having a screw hole and may be fixed to the first slide cover 2201 of the slide body 220 through a screw.

Figure 6A:
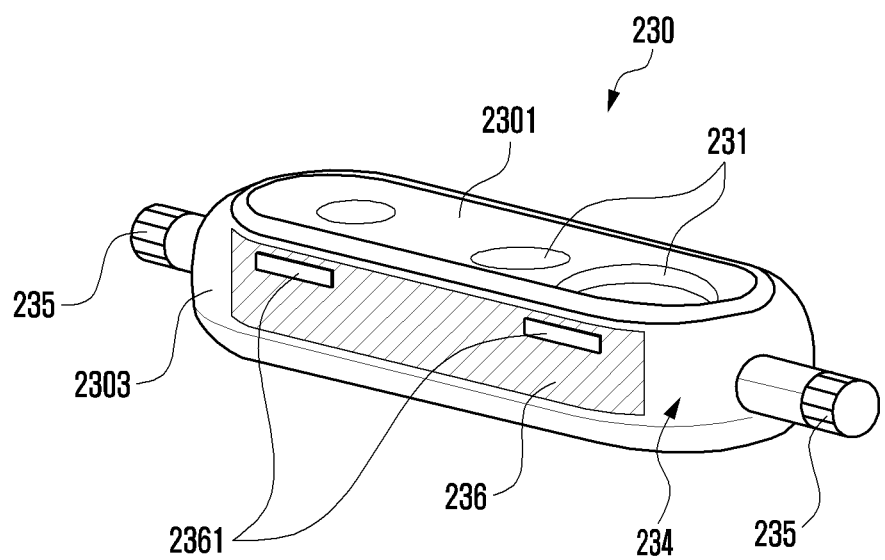
FIGS. 6A and 6B are perspective views illustrating the configuration of a camera module assembly in different directions according to certain embodiments of the disclosure.
Figure 6B:
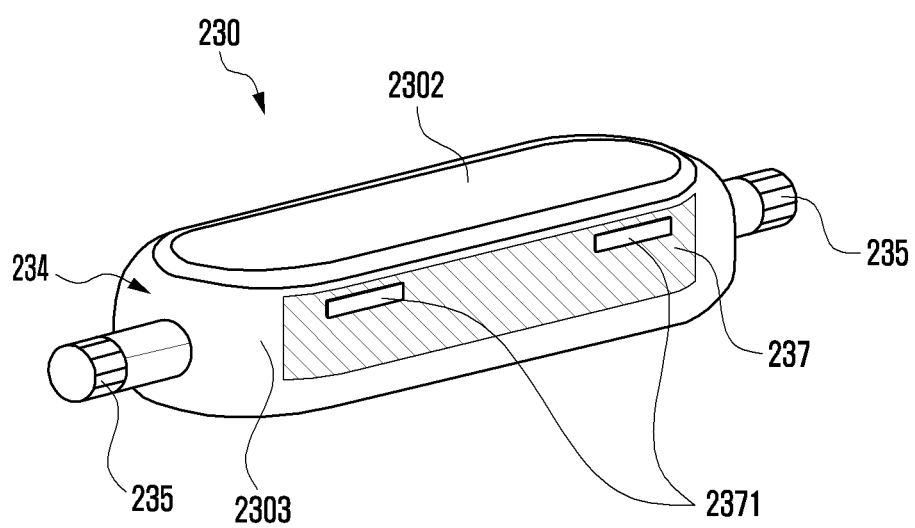

FIGS. 6A and 6B are perspective views illustrating the configuration of a camera module assembly 230 in different directions according to certain embodiments of the disclosure.

With reference to FIGS. 6A and 6B, the camera module assembly 230 may include a module housing 234 (e.g., a module housing structure), a first module surface 2301, a second module surface 2302, and a module side surface 2303. The at least one camera module 231 is exposed to the first module surface 2301. The second module surface 2302 faces in the opposite direction to the first module surface 2301. The module side surface 2303 surrounds a space between the first and second module surfaces 2301 and 2302. The camera module assembly 230 may include pinion gears 235 that are formed to protrude at positions opposite to each other in a longitudinal direction of the module side surface 2303 and each of which has a pinion gear disposed at an end. The pinion gears 235 may be combined with the rack gear modules (e.g., the rack gear modules 245 in FIG. 4) mounted in the housing structure (e.g., the housing structure 210 in FIG. 2A) of the electronic device (e.g., the electronic device 200 in FIG. 4) when the camera module assembly 230 is mounted through the opening (e.g., the opening 223 in FIG. 4) of the slide body (e.g., the slide body 220 in FIG. 4).

The camera module assembly 230 may include at least one first magnetic force reactive member 2361 and at least one second magnetic force reactive member 2371 disposed on at least a partial region of the module side surface 2303 facing in the opposite directions. The at least one first magnetic force reactive member 2361 and the at least one second magnetic force reactive member 2371 may include a metal piece or a magnet that reacts to the magnetic force of the at least one magnetic force generating member (e.g., the magnetic force generating member 281 in FIG. 7A). The at least one first magnetic force reactive member 2361 and the at least one second magnetic material 2371 may be disposed at positions responsive to the magnetic force of the at least one magnetic force generating member (e.g., the magnetic force generating member 281 in FIG. 7A) disposed in the opening (e.g., the opening 223 in FIG. 4) of the electronic device.

Because of the magnetic force generated by the magnetic force generating member (e.g., the magnetic force generating member 281 in FIG. 7A), the at least one first magnetic force reactive member 2361 and the at least one second magnetic force reactive member 2371 may induce the camera module assembly 230 to rotate with a rotation amount (e.g., 180 degrees) that matches the outer surface of the second slide cover (e.g., the second slide cover 2202 in FIG. 3A). The at least one first magnetic force reactive member 2361 and 2371 may be formed of a magnet disposed such that its second polarity (e.g., S pole) faces an opposite first polarity (e.g., N pole) of the magnetic force generating member, and using attractive forces by different polarities, may induce the camera module assembly 230 to rotate with a rotation amount (e.g., 180 degrees) that matches the outer surface of the second slide cover (e.g., the second slide cover 2202 in FIG. 3A).

When the module housing 234 is formed through injection molding, the at least one first magnetic force reactive member 2361 and the at least one second magnetic force reactive member 2371 may be attached to the outer surface of the module side surface 2303 or injected (e.g., insert-injected or double-injected) into the inside of the module housing 234. In another embodiment, the at least one first magnetic force reactive member 2361 and the at least one second magnetic force reactive member 2371 may be disposed on the inner surface of the module housing 234 in the inner space. In this case, the at least one first magnetic force reactive member 2361 and the at least one second magnetic force reactive member 2371 may substantially coincide with the outer surface of the module housing 234. For example, the first and second magnetic force reactive members 2361 and 2371 may be formed to have substantially the same shapes corresponding to the shape of the outer surface of the module housing 234.

Figure 7A:
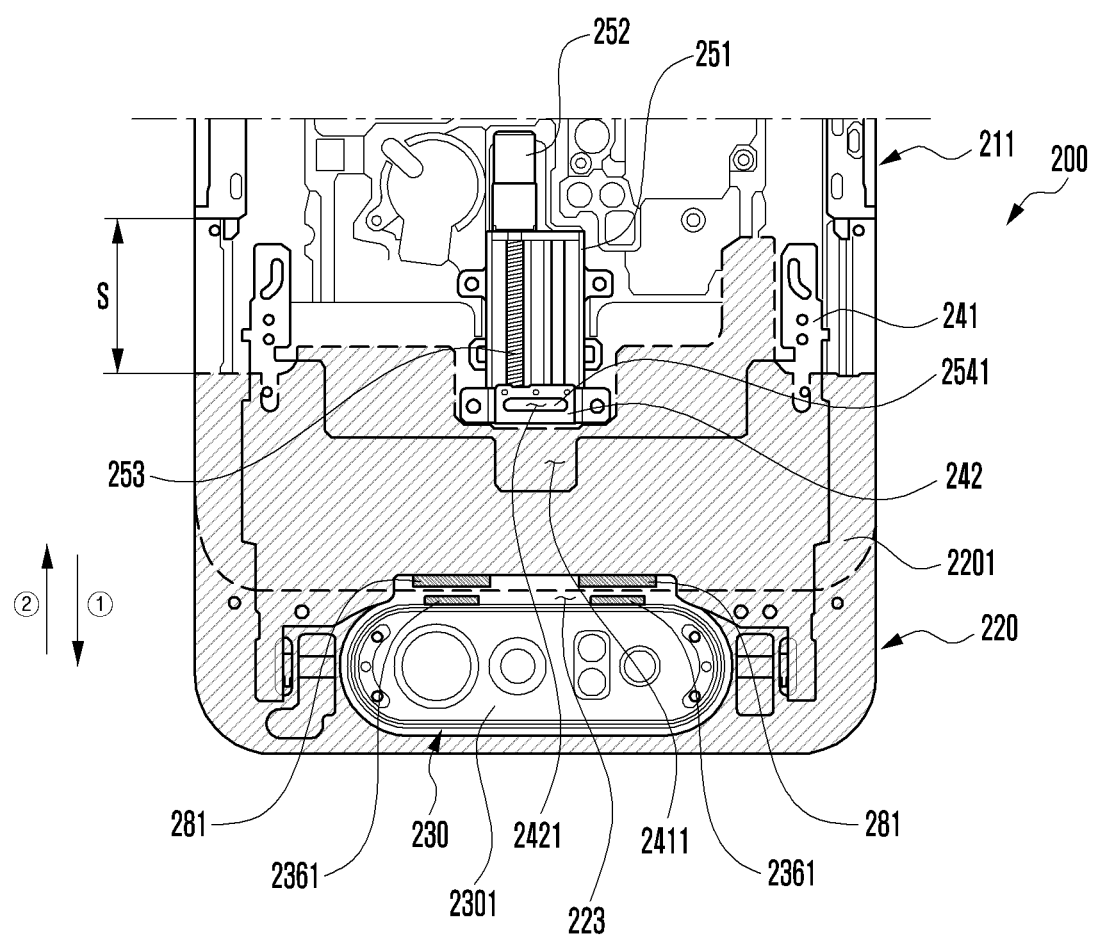
FIGS. 7A and 7B are partial configuration views illustrating a disposition relationship between a magnetic force generating member and a magnetic force reactive member of an electronic device in a slide-in or slide-out state of a slide body according to certain embodiments of the disclosure.

The camera module assembly 230 may include at least one blocking member 236 or 237 disposed between the camera module 231 and the first magnetic force reactive member 2361 or the second magnetic force reactive member 2371 so as to block a magnetic force of the at least one magnetic force generating member (e.g., the magnetic force generating member 281 in FIG. 7A). For example, the at least one blocking member 236 or 237 for magnetic force blocking may be formed to block, among magnetic forces generated by the magnetic force generating member 281, magnetic forces other than a magnetic force that transmits a force for inducing an accurate rotation amount of the camera module assembly 230 through the at least one first magnetic force reactive member 2361 and the at least one second magnetic force reactive member 2371.

The at least one blocking member 236 or 237 may be disposed in a sheet form on a corresponding outer surface (e.g., the module side surface 2303) of the module housing 234. In another embodiment, at least a portion of the module housing 234 may be formed of a magnetic blocking metal.

Figure 7B:
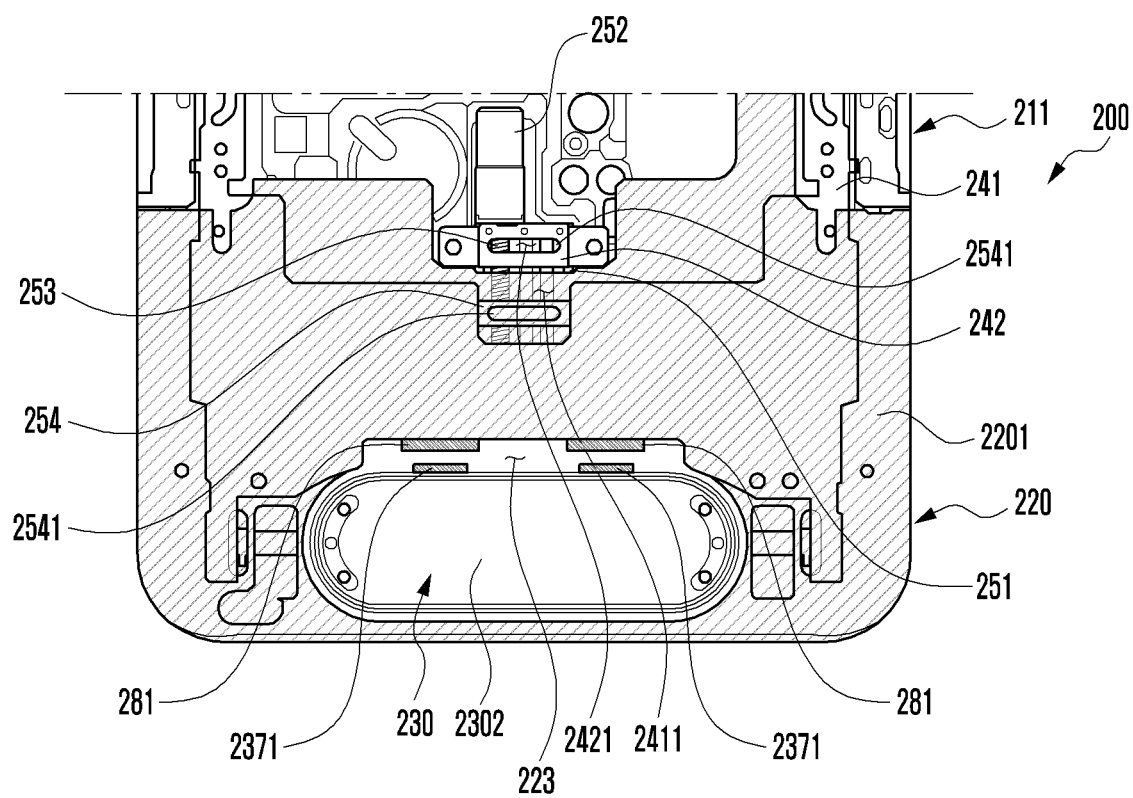

FIGS. 7A and 7B are partial configuration views illustrating a disposition relationship between a magnetic force generating member 281 and a magnetic force reactive member 2361 or 2371 of an electronic device 200 in a slide-in or slide-out state of a slide body 220 according to certain embodiments of the disclosure.

With reference to FIGS. 7A and 7B, the electronic device 200 may include the slide body 220 that is disposed to be slidable on the side member 211. According to an embodiment, in the electronic device 200, the camera module assembly 230 may be disposed in the opening 223 formed in at least partial region of the slide body 220 to be rotatable in response to the slide-in or slide-out operation of the slide body 220. The camera module assembly 230 may include at least one first magnetic force reactive member 2361 and at least one second magnetic force reactive member 2371 that are disposed at positions opposite to each other on a module side surface (e.g., the module side surface 2303 in FIG. 6A) among outer surfaces of a module housing (e.g., the module housing 234 in FIG. 6A). The electronic device 200 may include the at least one magnetic force generating member 281 disposed in the opening 223 of the slide body 220. The magnetic force generating member 281 may be disposed at a position corresponding to the at least one first magnetic force reactive member 2361 disposed in the camera module assembly 230 to apply a magnetic force. According to an embodiment, when the camera module assembly 230 rotates, the at least one second magnetic force reactive member 2371 may also be affected by the magnetic force of the at least one magnetic force generating member 281 by moving to a position substantially the same as the position where the at least one first magnetic force reactive member 2361 was disposed. The at least one magnetic force generating member 281 may include a magnet.

The position of the at least one first magnetic force reactive member 2361, the at least one second magnetic force reactive member 2371, or the at least one magnetic force generating member is not limited to that shown in FIG. 7A or 7B, and can be disposed anywhere as long as it helps the rotation of the camera module assembly 230. The magnetic force of the magnet may be set to a strength that does not affect the rotational force of the driving unit. For example, the magnetic force of the at least one magnetic force generating member 281 may be set to be weaker than the rotational force of the camera module assembly 230 by the slide body 220 sliding through the driving unit 250. The slide body 220 may receive the driving force of the driving motor 252 and thereby slide out by the entire moving distance (S in FIG. 3B) in the direction ① (the direction in which the slide body slides out). For example, the nut frame 254 may be moved in the direction ① by the rotation of the driving shaft 253 through the driving motor 252, and the slide body 220 may be operated by interlocking with the coupling structure that the locking protrusion 2541 of the nut frame 254 is inserted into the locking groove 2421 of the locker 242 fixed to the slide body 220. Conversely, the slide body 220 may slide in into the side member 211 by the rotation of the driving shaft 253 in the opposite direction (e.g., the direction 2) through the driving motor 252.

According to certain embodiments, in a state that the slide body 220 slides out, the electronic device 200 may perform a camera function using the camera module assembly 230 rotated in a direction (e.g., the z-axis direction in FIG. 2A) faced by the front cover (e.g., the front cover 202 in FIG. 2A). According to an embodiment, in a state that the slide body 220 slides out from the side member 211, the camera module assembly 230 may operate such that the first module surface 2301 rotates in the direction faced by the front cover (e.g., the front cover 202 in FIG. 2A). According to an embodiment, immediately before the camera module assembly 230 is rotated by a predetermined rotation amount (e.g., 180 degrees), the at least one first magnetic force reactive member 2361 may react to the magnetic force of the at least one magnetic force generating member 281 disposed in the opening 223 of the slide body 220. For example, the magnetic force reactive member may receive a force to move in a certain direction due to the magnetic force generated by the magnetic force generating member 281, so that the camera module assembly 230 may be affected in the amount of rotation, the rotation direction, or the rotation position by the force received by the magnetic force reactive member and thereby rotate to a designated position. The at least one first magnetic force reactive member 2361 may react to the magnetic force of the at least one magnetic force generating member 281 disposed in the opening 223, whereby the camera module assembly 230 may be induced such that the first module surface 2301 rotates with a rotation amount (e.g., 180 degrees) coincident with the outer surface of the second slide cover (e.g., the second slide cover 2202 in FIG. 3A) of the slide body 220.

According to certain embodiments, in a state that the slide body 220 slides in, the electronic device 200 may perform a camera function using the camera module assembly 230 rotated in a direction (e.g., the negative z-axis direction in FIG. 2B) faced by the rear cover (e.g., the rear cover 204 in FIG. 2B). According to an embodiment, in a state that the slide body 220 slides in into the side member 211, the camera module assembly 230 may operate such that the second module surface 2302 rotates in the direction faced by the front cover. According to an embodiment, immediately before the camera module assembly 230 is rotated by a predetermined rotation amount (e.g., 180 degrees), the at least one second magnetic force reactive member 2371 may react to the magnetic force of the at least one magnetic force generating member 281 disposed in the opening 223 of the slide body 220. The at least one second magnetic force reactive member 2371 may react to the magnetic force of the at least one magnetic force generating member 281 disposed in the opening 223, whereby the camera module assembly 230 may be induced such that the second module surface 2302 rotates with a rotation amount (e.g., 180 degrees) coincident with the outer surface of the second slide cover 2202 of the slide body 220. For example, in this case, the camera module assembly 230 may be induced such that the first module surface 2301 rotates with a rotation amount coincident with the outer surface of the first slide cover (e.g., the first slide cover 2201 in FIG. 2B) of the slide body 220. The amount of magnetic force generation may be adjusted through electrical control of the magnetic force generating member 281. For example, using the control of the magnetic force or polarity of the magnetic force generating member 281, the electronic device may control the camera module assembly 230 to rotate in a designated direction or a designated position.

Figure 8A:
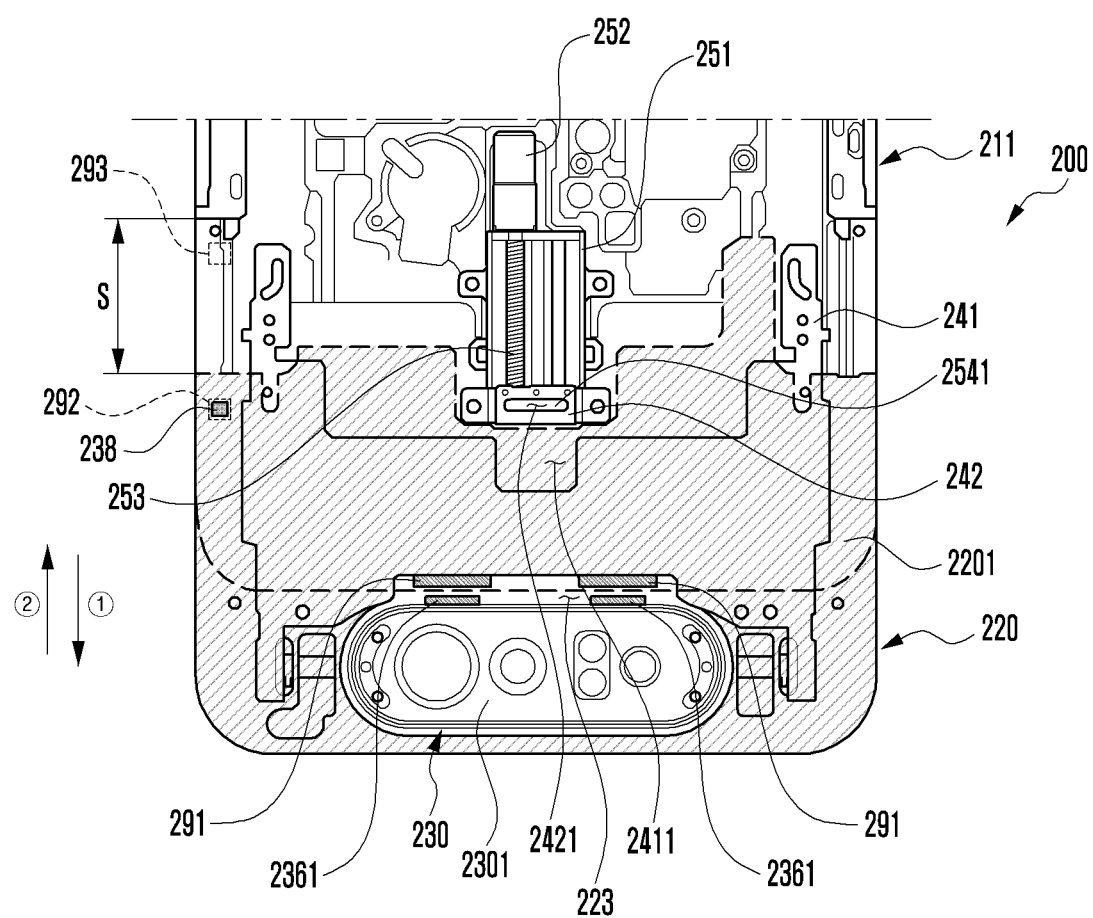
FIGS. 8A and 8B are partial configuration views illustrating a disposition relationship between a magnetic force generating member and a magnetic force reactive member of an electronic device in a slide-in or slide-out state of a slide body according to certain embodiments of the disclosure.
Figure 8B:
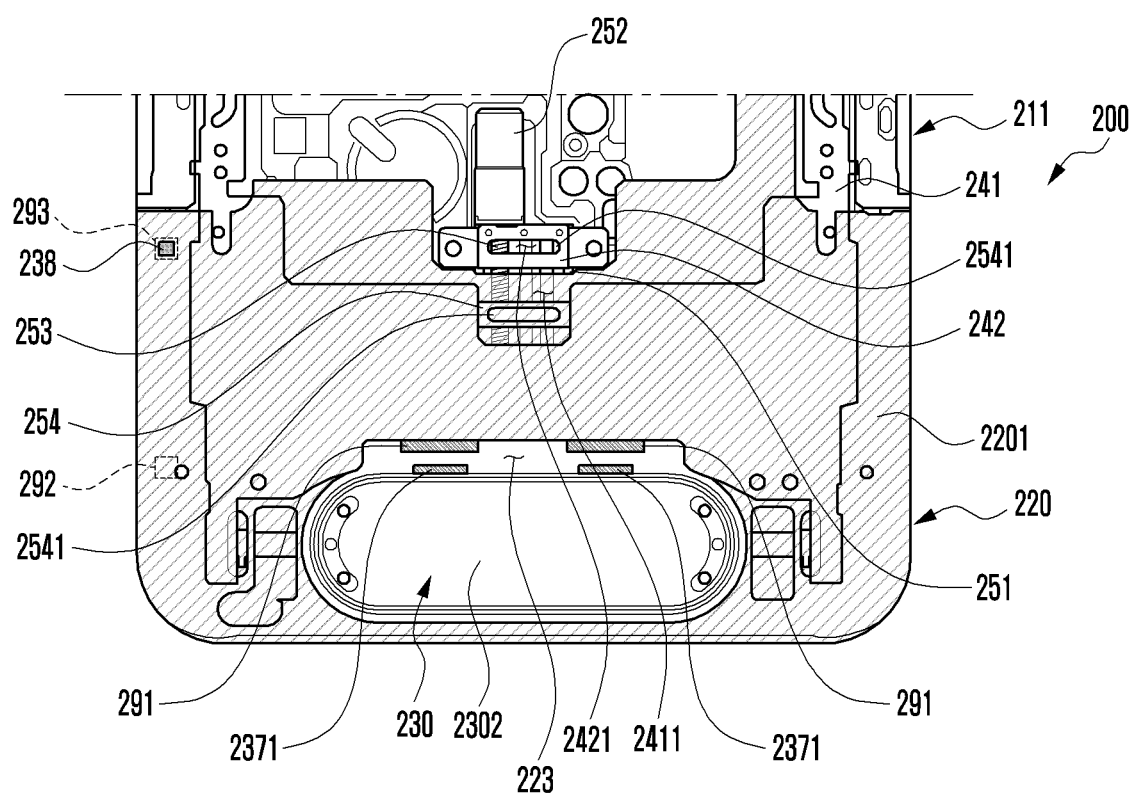

FIGS. 8A and 8B are partial configuration views illustrating a disposition relationship between a magnetic force generating member 291 and a magnetic force reactive member 2361 or 2371 of an electronic device in a slide-in or slide-out state of a slide body 220 according to certain embodiments of the disclosure.

In describing FIGS. 8A and 8B, the disposition of the magnetic force generating member 291 and the magnetic force reactive member 2361 or 2371 is substantially the same as in FIGS. 7A and 7B, and thus detailed description thereof may be omitted.

With reference to FIGS. 8 and 8B, the at least one magnetic force generating member 291 may include at least one electromagnet disposed to selectively receive power through a processor (e.g., the processor 120 in FIG. 1) of the electronic device 200. The processor (e.g., the processor 120 in FIG. 1) may detect a slide-out position or slide-in position of the slide body 220 and, depending on a detection result, control whether to apply or not the power to the electromagnet. The electronic device 200 may include a detection target member 238 disposed on the slide body 220, and at least one detection member 292 or 293 disposed on at least a portion of the side member 211 so as to detect the position of the slide body 220 according to slide-in or slide-out. The at least one detection member 292 or 293 may include a first detection member 292 for detecting the detection target member 238 when the slide body 220 slides out, and a second detection member 293 for detecting the detection target member 238 when the slide body 220 slides in. The detection target member 238 may include a magnet. The first and second detection members 292 and 293 may include a hall sensor that detects a magnetic force of a magnet.

According to an embodiment, in a state that the slide body 220 slides out from the side member 211, the camera module assembly 230 may operate such that the first module surface 2301 rotates in the direction faced by the front cover (e.g., the front cover 202 in FIG. 2A). At the same time, the processor (e.g., the processor 120 in FIG. 1) may detect the detection target member 238 through the first detection member 292 to detect an operating state of the slide body 220 immediately before sliding out or completely sliding out from the side member 211, thereby operating the at least one magnetic force generating member 291 (e.g., an electromagnet). In this case, the at least one first magnetic force reactive member 2361 may react to the magnetic force of the at least one magnetic force generating member 291 disposed in the opening 223, whereby the camera module assembly 230 may be induced such that the first module surface 2301 rotates with a rotation amount (e.g., 180 degrees) coincident with the outer surface of the second slide cover (e.g., the second slide cover 2202 in FIG. 3A) of the slide body 220. The electronic device 200 may detect the slide-out of the slide body 220 and, when the slide-out comes to a specific position (e.g., in a fully slide-out state), generate a magnetic force through the at least one magnetic force generating member 291 such that the camera module assembly 230 further rotates in a designated direction so as to prevent the camera module assembly from failing to rotate by a specified amount of rotation through the rack and pinion. There may occur a case where the camera module assembly 230 does not rotate normally or does not rotate with a specified rotation amount (e.g., 180 degrees). In order to prevent this matter, the electronic device may use a magnetic force for rotation. According to an embodiment, after the rotation of the camera module assembly 230, the electronic device 200 may determine whether the camera module assembly 230 rotates normally. If the camera module assembly 230 does not rotate normally, the electronic device 200 may generate a magnetic force such that the camera module assembly 230 rotates to a designated position by additionally using the magnetic force. For example, based on photographed information, it may be determined whether the camera module assembly 230 has rotated normally. For example, it is possible to determine the rotation or position of the camera module assembly and thereby determine that the camera module assembly fails to rotate to a normal position. According to an embodiment, using the hall sensor, the electronic device may detect whether the camera module assembly has rotated normally. According to an embodiment, when the camera module assembly 230 fails to rotate normally, the electronic device 200 may generate a magnetic force such that the camera module assembly 230 rotates to a designated position by additionally using the magnetic force.

According to certain embodiments, in a state that the slide body 220 slides in into the side member 211, the camera module assembly 230 may operate such that the second module surface 2302 rotates in the direction faced by the front cover. At the same time, the processor (e.g., the processor 120 in FIG. 1) may detect whether the slide body is in a slide-in state or in a slide-out state. For example, the processor may detect the detection target member 238 through the second detection member 293 to detect an operating state of the slide body 220 immediately before sliding in or completely sliding in into the side member 211, thereby operating the at least one magnetic force generating member 291 (e.g., an electromagnet). In this case, the at least one second magnetic force reactive member 2371 may react to the magnetic force of the at least one magnetic force generating member 291 disposed in the opening 223, whereby the camera module assembly 230 may be induced such that the second module surface 2302 rotates with a rotation amount (e.g., 180 degrees) coincident with the outer surface of the second slide cover 2202 of the slide body 220. For example, in this case, the camera module assembly 230 may be induced such that the first module surface 2301 rotates with a rotation amount coincident with the outer surface of the first slide cover (e.g., the first slide cover 2201 in FIG. 2B) of the slide body 220.

According to certain embodiments, in a state that the slide body slides out from the side member or slides in into the side member, the processor of the electronic device may stop the magnetic force generation by cutting off the power applied to the at least one magnetic force generating member when a predetermined time elapses after the at least one first magnetic force reactive member or the at least one second magnetic force reactive member of the camera module assembly is affected by the magnetic force of the at least one magnetic force generating member. This is to prevent unnecessary consumption of power continuously applied to the magnetic force reactive member.

The at least one first magnetic force reactive member and the at least one second magnetic force reactive member disposed in the camera module assembly may include a magnet. In this case, by disposing the magnet to have a magnetic force having a polarity opposite to that of a magnetic force generated by the at least one magnetic force generating member (e.g., a magnet or an electromagnet), the correction of the rotation amount of the camera module assembly may be maximized through attractive force.

According to certain embodiments, an electronic device (e.g., the electronic device 200 in FIG. 2A) may include a housing (e.g., the housing 210 in FIG. 2A) having an inner space, a slide body slidably connected to the housing and including an opening (e.g., the opening 223 in FIG. 7A) and at least one magnetic force generating member (e.g., the magnetic force generating member 281 in FIG. 2A) disposed in the opening, and a camera module assembly (e.g., the camera module assembly 230 in FIG. 4) connected rotatably to the opening in the slide body and including at least one camera module. The camera module assembly may include at least one magnetic force reactive member (e.g., the at least one first magnetic force reactive member 2361 in FIG. 6A) disposed to react to a magnetic force generating member. The at least one magnetic force reactive member may be disposed at a position affected by the magnetic force of the magnetic force generating member when the slide body slides out from the housing or slides in into the housing.

According to certain embodiments, the at least one magnetic force generating member may include a permanent magnet.

According to certain embodiments, the at least one magnetic force reactive member may include a magnet or a metal member responsive to a magnetic force.

According to certain embodiments, when the at least one magnetic force reactive member is magnet, the magnet may be disposed such that a polarity thereof faces an opposite polarity of the at least one magnetic force generating member.

According to certain embodiments, the module housing may further include a blocking member (e.g., the blocking member 236 or 237 in FIGS. 6A and 6B) for blocking the magnetic force of the at least one magnetic force generating member.

According to certain embodiment, the module housing may include a first module surface (e.g., the first module surface 2301 in FIG. 6A) to which the at least one camera module is exposed to an outside, a second module surface (e.g., the second module surface 2302 in FIG. 6A) facing in a direction opposite to the first module surface, and a module side surface (e.g., the module side surface 2303 in FIG. 6A) surrounding a space between the first module surface and the second module surface.

According to certain embodiments, the at least one magnetic force reactive member may include at least one magnetic force reactive member (e.g., the first magnetic force reactive member 2361 in FIG. 6A) disposed on at least a partial region of the module side surface, and at least one second magnetic force reactive member (e.g., the second magnetic force reactive member 2371 in FIG. 6B) disposed on a region of the module side surface, facing in a direction opposite to the at least partial region. The at least one first magnetic force reactive member or the at least one second magnetic force reactive member may be disposed to face the magnetic force generating member according to a rotation of the module housing interlocking with a slide-in or slide-out operation of the slide body.

According to certain embodiments, the housing may include a front cover (e.g., the front cover 202 in FIG. 4), a rear cover (e.g., the rear cover 204 in FIG. 4) facing in a direction opposite to the front cover, and a side member (e.g., the side member 211 in FIG. 4) surrounding at least in part a space between the front cover and the rear cover. The slide body may include a first slide cover (e.g., the first slide cover 2201 in FIG. 4) and a second slide cover (e.g., the second slide cover 2202 in FIG. 4). When the slide body slides out from the housing, the first slide cover may be exposed to the outside and face substantially the same direction as the rear cover, and the second slide cover may face in a direction opposite to the first slide cover and face substantially the same direction as the front cover. The opening may be formed in a portion of the first and second slide covers.

According to certain embodiments, in a state that the slide body slides out from the housing, the at least one first magnetic force reactive member may face the at least one magnetic force generating member such that the first module surface of the module housing is formed in a plane substantially coincident with one side surface of the second slide cover.

According to certain embodiments, in a state that the slide body slides in into the housing, the at least one second at least one second magnetic force reactive member may face the at least one magnetic force generating member such that the first module surface of the module housing coincides with an outer surface of the first slide cover.

The electronic device may further include a display (e.g., the display 201 in FIG. 4) visible from the outside through at least a portion of the front cover in the inner space of the housing.

The at least one magnetic force generating member may include at least one electromagnet (e.g., the electromagnet 291 in FIG. 8A), and the electronic device may further include at least one processor (e.g., the processor 120 in FIG. 1) that controls to apply power to the electromagnet in response to a slide-in or slide-out operation of the slide body.

The electronic device may further include a detection member (e.g., the detection member 292 or 293 in FIG. 8A) for detecting a slide-in or slide-out state of the slide body. The at least one processor may control the at least one electromagnet, based on state information of the slide body received from the detection member.

The detection member may be disposed on the housing and include at least one Hall sensor.

The at least one processor may control to apply power to the electromagnet for a predetermined time after the slide-in or slide-out state of the slide body is detected.

According to certain embodiments, an electronic device (e.g., the electronic device 200 in FIG. 2A) may include a housing (e.g., the housing 210 in FIG. 2A) having an inner space, a slide body (e.g., the slide body 220 in FIG. 2B) disposed slidably from the housing and including an opening (e.g., the opening 223 in FIG. 7A) and at least one magnetic force generating member (e.g., the magnetic force generating member 281 in FIG. 7A) disposed in the opening, and a rotating structure (e.g., the camera module assembly 230 in FIG. 4) including a module housing (e.g., the module housing 234 in FIG. 6A) disposed rotatably through the opening in the slide body, and at least one magnetic force reactive member (e.g., the first magnetic force reactive member 2361 in FIG. 6A or the second magnetic force reactive member 2371 in FIG. 6B) disposed to react to a magnetic force of the at least one magnetic force generating member in the module housing. The at least one magnetic force reactive member may be disposed at a position affected by the magnetic force of the at least one magnetic force generating member in a state that the slide body slides out from the housing or slides in into the housing.

The at least one magnetic force generating member may include a magnet.

The at least one magnetic force generating member may include at least one electromagnet. The electronic device may further include at least one processor that controls to apply power to the electromagnet in response to a slide-in or slide-out operation of the slide body.

The at least one magnetic force reactive member may include a magnet or a metal member responsive to a magnetic force.

According to certain embodiments, an electronic device (e.g., the electronic device 200 in FIG. 2A) may include a housing (e.g., the housing 210 in FIG. 2A) having an inner space, a slide body (e.g., the slide body 220 in FIG. 2B) disposed slidably from the housing and including an opening (e.g., the opening 223 in FIG. 7A), at least one magnetic force generating member (e.g., the magnetic force generating member 281 in FIG. 7A) disposed in the opening, and a rack gear module (e.g., the rack gear module 245 in FIG. 4) disposed to be movable at least in part together with the slide body in a sliding direction, a camera module assembly (e.g., the camera module assembly 230 in FIG. 4) disposed rotatably through the opening in the slide body and including a module housing (e.g., the module housing 234 in FIG. 6A), at least one magnetic force reactive member (e.g., the first magnetic force reactive member 2361 in FIG. 6A or the second magnetic force reactive member 2371 in FIG. 6B) disposed to react to a magnetic force of the at least one magnetic force generating member in the module housing, at least one camera module (e.g., the camera module 231 in FIG. 6A) disposed to be at least partially exposed to an outside in the module housing, and a pinion gear (e.g., the pinion gear 235 in FIG. 4) protruding to the outside of the module housing and engaging with the rack gear module, wherein the module housing may be rotatably disposed by the pinion gear engaging with the rack gear module, and a driving unit (e.g., the driving unit 250 in FIG. 4) disposed in the inner space and moving the slide body. The module housing may be rotated such that the at least one camera module faces a first direction (e.g., the z-axis direction in FIG. 2A) in a state that the slide body slides out from the housing through the driving unit, and may be rotated such that the at least one camera module faces a second direction (e.g., the negative z-axis direction in FIG. 2B) opposite to the first direction in a state that the slide body slides in into the housing. The at least one magnetic force reactive member may be disposed at a position affected by the magnetic force of the at least one magnetic force generating member in a state that the slide body slides out from the housing or slides in into the housing.

The embodiments of the disclosure disclosed in the specification and drawings are merely provided for specific examples in order to easily explain the technical contents according to the embodiments of the disclosure and help the understanding of the embodiments of the disclosure, and are not intended to limit the scope of the embodiments of the disclosure. Therefore, the scope of certain embodiments of the disclosure should be construed to include all changes or modifications derived from the technical ideas of certain embodiments of the disclosure in addition to the embodiments disclosed herein.

The invention claimed is:

1. An electronic device comprising:
   a housing;
   a slide body slidably connected to the housing, the slide body including an opening and at least one magnetic force generating member disposed in the opening;
   a rack gear module disposed to be movable at least in part together with the slide body in a sliding direction; and
   a camera module assembly connected rotatably to the opening in the slide body and including:
      a module housing;
      at least one magnetic force reactive member disposed in the module housing to react to a magnetic force of the at least one magnetic force generating member; and
      a pinion gear module protruding to the outside of the module housing and engaging with the rack gear module,
   wherein the module housing is rotatable disposed through an engagement the rack gear module and the pinion gear module according to a sliding operation of the slide body, and
   wherein the at least one magnetic force reactive member is disposed at a position affected by the magnetic force of the at least one magnetic force generating member when the slide body slides out from the housing or slides in into the housing.

2. The electronic device of claim 1, wherein the at least one magnetic force generating member includes a permanent magnet.

3. The electronic device of claim 1, wherein the at least one magnetic force reactive member includes a magnet or a metal member responsive to a magnetic force.

4. The electronic device of claim 3, wherein when the at least one magnetic force reactive member is disposed such that a polarity thereof faces an opposite polarity of the at least one magnetic force generating member.

5. The electronic device of claim 1, wherein the module housing further includes a blocking member for blocking the magnetic force of the at least one magnetic force generating member.

6. The electronic device of claim 1, wherein the housing includes a front cover, a rear cover facing in a direction opposite to the front cover, and a side member surrounding at least in part an inner space between the front cover and the rear cover, and
   wherein the slide body includes a first slide cover and a second slide cover, and when the slide body slides out from the housing, the first slide cover is exposed to the outside and faces substantially a same direction as the rear cover, and the second slide cover faces in a direction opposite to the first slide cover and faces substantially the same direction as the front cover, and
   wherein the opening is formed in a portion of the first slide cover and the second slide cover.

7. The electronic device of claim 6, wherein in a state that the slide body slides out from the housing, the at least one first magnetic force reactive member faces the at least one magnetic force generating member such that the first module surface of the module housing is formed in a plane substantially coincident with one side surface of the second slide cover.

8. The electronic device of claim 6, wherein in a state that the slide body slides in into the housing, the at least one second magnetic force reactive member faces the at least one magnetic force generating member such that the first module surface of the module housing coincides with an outer surface of the first slide cover.

9. The electronic device of claim 6, further comprising:
   a display visible from the outside through at least a portion of the front cover in the inner space of the housing.

10. The electronic device of claim 1, wherein the at least one magnetic force generating member includes at least one electromagnet, and
    wherein the electronic device further comprises at least one processor that controls to apply power to the at least one electromagnet in response to a slide-in or slide-out operation of the slide body.

11. The electronic device of claim 10, further comprising:
    a detection member for detecting a slide-in or slide-out state of the slide body,
    wherein the at least one processor controls the at least one electromagnet, based on state information of the slide body received from the detection member.

12. The electronic device of claim 11, wherein the detection member is disposed on the housing and includes at least one Hall sensor.

13. The electronic device of claim 11, wherein the at least one processor controls to apply power to the at least one electromagnet for a predetermined time after the slide-in or slide-out state of the slide body is detected.

14. An electronic device comprising:
    a housing;
    a slide body disposed slidably from the housing and including an opening and at least one magnetic force generating member disposed in the opening;
    a rack gear module disposed to be movable at least in part together with the slide body in a sliding direction; and
    a rotating structure including:
       a module housing disposed rotatably through the opening in the slide body, and
       at least one magnetic force reactive member disposed to react to a magnetic force of the at least one magnetic force generating member in the module housing, and
       a pinion gear module protruding to the outside of the module housing and engaging with the rack gear module,
    wherein the module housing is rotatable disposed through an engagement the rack gear module and the pinion gear module according to a sliding operation of the slide body, and
    wherein the at least one magnetic force reactive member is disposed at a position affected by the magnetic force of the at least one magnetic force generating member in a state that the slide body slides out from the housing or slides in into the housing.

15. The electronic device of claim 14, wherein the at least one magnetic force generating member includes a magnet.

16. The electronic device of claim 14, wherein the at least one magnetic force generating member includes at least one electromagnet, and
   wherein the electronic device further comprises at least one processor that controls to apply power to the at least one electromagnet in response to a slide-in or slide-out operation of the slide body.

17. The electronic device of claim 14, wherein the at least one magnetic force reactive member includes a magnet or a metal member responsive to a magnetic force.

18. An electronic device comprising:
   a housing having an inner space;
   a slide body disposed slidably from the housing and including:
      an opening;
      at least one magnetic force generating member disposed in the opening; and
      a rack gear module disposed to be movable at least in part together with the slide body in a sliding direction;
   a camera module assembly disposed rotatably through the opening in the slide body and including:
      a module housing;
      at least one magnetic force reactive member disposed to react to a magnetic force of the at least one magnetic force generating member in the module housing;
      at least one camera module disposed to be at least partially exposed to an outside in the module housing; and
      a pinion gear module protruding to the outside of the module housing and engaging with the rack gear module,
      wherein the module housing is rotatably disposed by the pinion gear module engaging with the rack gear module; and
   a driving unit disposed in the inner space and moving the slide body,
   wherein the module housing is rotated such that the at least one camera module faces a first direction in a state that the slide body slides out from the housing through the driving unit, and is rotated such that the at least one camera module faces a second direction opposite to the first direction in a state that the slide body slides in into the housing, and
   wherein the at least one magnetic force reactive member is disposed at a position affected by the magnetic force of the at least one magnetic force generating member in a state that the slide body slides out from the housing or slides in into the housing.

\* \* \* \* \*